No. 811,632.    PATENTED FEB. 6, 1906.
A. W. GRAHAM.
PIPE COUPLING.
APPLICATION FILED APR. 18, 1905.
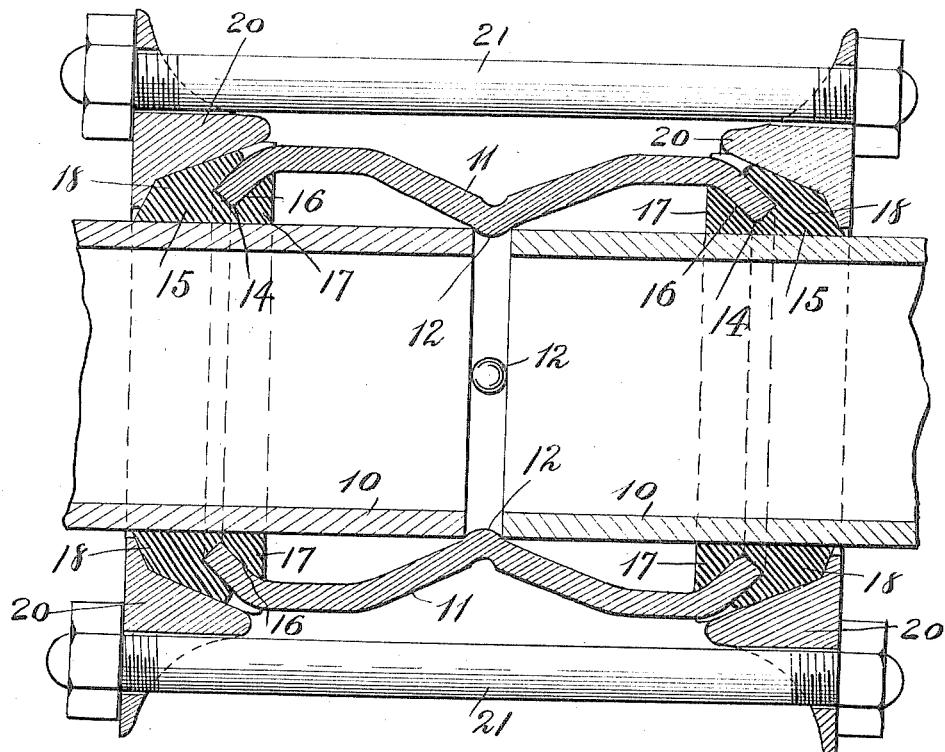
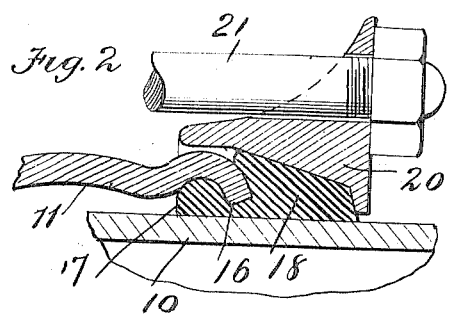 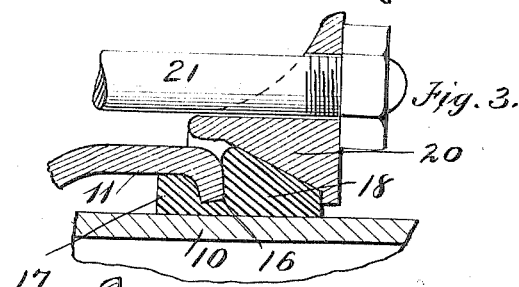
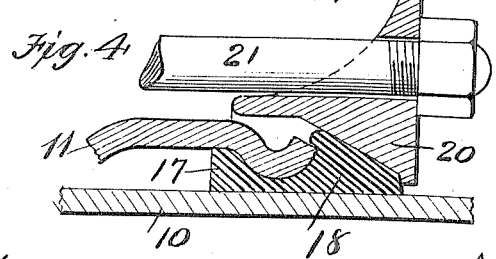 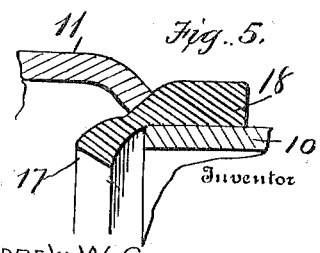
Witnesses
F. L. Ourand.
W. H. Ourand.
Andrew W. Graham.
By Albert Popkins
Attorney.

UNITED STATES PATENT OFFICE.

ANDREW WALTER GRAHAM, OF BRADFORD, PENNSYLVANIA, ASSIGNOR OF ONE-HALF TO LEWIS E. MALLORY, OF BRADFORD, PENNSYLVANIA.

PIPE-COUPLING.

No. 811,632.  Specification of Letters Patent.  Patented Feb. 6, 1906.

Application filed April 18, 1905. Serial No. 256,281.

*To all whom it may concern:*

Be it known that I, ANDREW WALTER GRAHAM, a citizen of the United States, residing at Bradford, in the county of McKean and State of Pennsylvania, have invented new and useful Improvements in Pipe-Couplings, of which the following is a specification.

This invention relates to pipe-couplings, and has for its principal object to provide a coupling in which the packing employed is subjected to tightening pressure from the fluid in the pipe and from external mechanical means.

A further object of the invention is to provide a coupling-sleeve and packing of such nature as to permit bending of the pipe-line at joints without injury to the packing and without danger of leakage.

A still further object of the invention is to provide a novel form of packing formed in such manner that the operation of assembling a coupling will adjust the packing to proper position.

With these and other objects in view, as will more fully hereinafter appear, the invention consists in the novel construction and arrangement of parts hereinafter described, illustrated in the accompanying drawings, and particularly pointed out in the appended claims, it being understood that various changes in the form and proportions of parts may be made without departing from the spirit or sacrificing any of the advantages of the invention.

In the accompanying drawings, Figure 1 is a sectional elevation of a pipe-coupling constructed in accordance with the invention. Figs. 2, 3, and 4 are similar views of portions of couplings, illustrating modifications of the invention. Fig. 5 is a detail view showing the manner in which the packing is placed in position.

Similar numerals of reference are employed to indicate corresponding parts throughout the several figures of the drawings.

The coupling forming the subject of the present invention is designed for general application and is of especial value in pipe-lines where the pipe must be laid on a more or less uneven surface and where some flexibility at the joints is desirable.

The pipe-sections 10 are in the form of simple straight cylinders without the usual bell or other integral coupling members. Adjacent pipe-sections are entered in the opposite ends of a coupling-sleeve 11, which may be formed of wrought or cast metal or other material. The central portion of this sleeve is provided with one or more inwardly-protruding lugs, knobs, or enlargements 12, which may be formed by upsetting the metal from the outer side of the sleeve if the latter is malleable or by forming the lugs thereon if the sleeve is cast. These lugs serve as means for centering the sleeve on the two pipe-sections to be coupled, said lugs preventing excessive movement in either direction, but yielding or breaking under excessive strain, so that when necessary a coupling-sleeve may be driven off by a mall or other tool when a broken sleeve or pipe-section is to be replaced. The opposite end portions of the sleeve are reduced in diameter, being entwined to form annular flanges 14, against which packing-rings 15 are seated. Each packing-ring has an annular groove 16, into which the flange 14 enters, and this groove acts in a measure to divide the packing-ring into inner and outer portions 17 and 18, the inner portion seating against the inner face of the flange 14 and being held tight by the pressure of fluid in the pipe, while the outer portion 18 fits over the outer end of the sleeve and is held in place by a compression-ring 20, having an inclined inner face for engagement with the packing. The rings 20 are of cast or other metal and are rigidly clamped together by bolts 21, passing through openings in the rings.

In introducing the packing-rings the outer portion 18 is stretched over the end of the pipe-section, as shown in Fig. 5, the inner portion 17 hanging loose at the pipe end. The pipe is then introduced within the sleeve, and as the grooved face 16 of the ring strikes the flange 14 of the sleeve the ring will be stopped, and on continued movement of the pipe the inner portion 17 of the ring will be forced up into the space in the rear of the flange 14 and will form the inner packing.

Should it be desired to flex the pipe, as when running a pipe-line over an uneven surface, one of the sections is drawn slightly outward until its end is clear of the central portion of the sleeve, after which the pipe may be turned to the desired angle. With an ordinary coupling this operation would compress the packing at the inner side of the bend and would leave the packing at the outer side loose, soon resulting in leakage. In the present case the portion 18 of the packing is tightly compressed at the inner side of the bend, and the portion 17 is compressed at the outer side of the bend, so that the packing cannot leak and will always remain fluid-tight.

Figs. 2, 3, and 4 show various forms of sleeve and packing embodying the invention and do not require detailed description.

With a coupling of the character described the packing is held on one side by the pressure of the fluid within the pipes and on the outer face is tightly compressed by the rings 20, so that, being packed on both sides, there is no danger of leakage.

Having thus described my invention, what I claim, and desire to secure by Letters Patent, is—

1. In a pipe-coupling, a sleeve having inturned end portions, packing-rings in which the ends of the sleeve are embedded and compression means acting against the outer faces of the rings.

2. The combination in a pipe-coupling, of a coupling-sleeve having inturned end portions, and packing members extending between the inner face of the sleeve and the exterior of the pipe-sections, the packing also extending over the ends of the sleeve, and a compression means acting against the outer portion of the packing.

3. In a pipe-coupling, a sleeve having opposite end portions of reduced diameter, and packing members leading over such end portions, said packing members being adapted to be forced into place by the introduction of a pipe-section within the sleeve.

4. In a pipe-coupling, a coupling-sleeve having reduced end portions, a packing-ring having a central annular groove for the reception of the end portion of the sleeve, the inner portions of the ring being forced within the sleeve by the introduction of the pipe thereinto, and a compression means acting against the outer face of the packing-ring.

5. In a pipe-coupling, of a sleeve having reduced end portions, a packing-ring provided with an annular groove in which the end portion of the sleeve is seated, the inner face of the packing-ring being subjected to the pressure of the fluid in the pipe, and a packing clamping-ring engaging the outer face of the packing-ring.

6. In a pipe-coupling, a coupling-sleeve having its central portion provided with projections to be introduced between the adjacent ends of the pipe-sections to be coupled, the opposite ends of the sleeve being reduced in diameter, packing-rings grooved for the reception of the ends of the sleeve, and compression members acting against the outer faces of the rings.

7. In a pipe-coupling, a sleeve having inturned end portions, and packing-rings grooved for the reception of said end portions and disposed both inside and outside of said inturned ends.

8. In a pipe-coupling, the combination with pipe-sections, of a sleeve having enlarged portions to permit flexing of the pipe-line, and duplex packing-rings fitting against the pipe-sections and engaging both the inner and outer faces of the ends of the sleeve, whereby movement of a pipe-section at an angle with respect to the sleeve will compress the inner portion of the packing-ring at one side and the outer portion of the same packing-ring at the opposite side of the sleeve.

In testimony whereof I affix my signature in presence of two subscribing witnesses.

ANDREW WALTER GRAHAM.

Witnesses:
ALBERT POPKINS,
BENNETT S. JONES.